United States Patent
Khayter et al.

(10) Patent No.: US 7,555,493 B2
(45) Date of Patent: Jun. 30, 2009

(54) APPARATUS, SYSTEMS AND METHODS FOR RELATIONAL DATABASE REPLICATION AND PROPRIETARY DATA TRANSFORMATION

(75) Inventors: Mark Khayter, Swampscott, MA (US); Robert F. Goulart, Weston, MA (US)

(73) Assignee: TransReplicator, Inc., Weston, MA (US)

(*) Notice: Subject to any disclaimer, the term of this patent is extended or adjusted under 35 U.S.C. 154(b) by 328 days.

(21) Appl. No.: 11/075,514

(22) Filed: Mar. 8, 2005

(65) Prior Publication Data

US 2005/0198074 A1    Sep. 8, 2005

Related U.S. Application Data

(60) Provisional application No. 60/550,951, filed on Mar. 8, 2004.

(51) Int. Cl.
*G06F 7/00* (2006.01)
*G06F 17/30* (2006.01)
*G06F 12/00* (2006.01)

(52) U.S. Cl. ...................... 707/102; 707/204
(58) Field of Classification Search .............. 707/102, 707/204
See application file for complete search history.

(56) References Cited

U.S. PATENT DOCUMENTS

| | | | |
|---|---|---|---|
| 5,745,753 A | 4/1998 | Mosher, Jr. | |
| 5,758,337 A | 5/1998 | Hammond | |
| 5,884,325 A | 3/1999 | Bauer et al. | |
| 6,151,608 A * | 11/2000 | Abrams | 707/204 |
| 6,195,658 B1 | 2/2001 | Comito et al. | |
| 6,643,670 B2 | 11/2003 | Parham et al. | |
| 7,020,804 B2 * | 3/2006 | Burdick et al. | 714/41 |
| 7,058,857 B2 * | 6/2006 | Dallin | 714/38 |
| 7,155,428 B1 * | 12/2006 | Brown et al. | 707/4 |
| 7,158,979 B2 * | 1/2007 | Iverson et al. | 707/100 |
| 7,376,708 B2 * | 5/2008 | Zubeldia et al. | 709/208 |
| 2003/0014394 A1 | 1/2003 | Fujiwara et al. | |
| 2004/0107213 A1 * | 6/2004 | Zubeldia et al. | 707/104.1 |
| 2004/0133591 A1 | 7/2004 | Holenstein et al. | |
| 2005/0055351 A1 | 3/2005 | Barton et al. | |

FOREIGN PATENT DOCUMENTS

EP    1 081 608 A2    3/2001

OTHER PUBLICATIONS

The Generator, Generate Live Test Databases in Internet Time, copyright 1999 http://web.archive.org/web/20000302145115/www.hallogram.com/generator/index.html, 3 pages.*

(Continued)

*Primary Examiner*—Pierre M Vital
*Assistant Examiner*—Jason Liao
(74) *Attorney, Agent, or Firm*—Hamilton, Brook, Smith & Reynolds, P.C.

(57) ABSTRACT

The present invention provides data replication and transformation. The invention system creates a replica version of a relational database based upon information obtained from a source database. The system populates the replica database with all or a portion of the data from the source database and transforms the data during the extraction process using a standard set of algorithms. This keeps any proprietary information in the source database from reaching the replica database while still retaining that source database's referential integrity. The system supports the process of reloading the replica databases interactively or on a scheduled basis running as a batch process. Included is a global network component that coordinates the reload among the various groups of users accessing the replica database and supports the addition of new or enhanced transform algorithms through the present invention web portal, as they become available.

20 Claims, 6 Drawing Sheets

Schematic illustration of one embodiment of the present invention

OTHER PUBLICATIONS

TestBytes brochure, Automated Generation of Realistic Test Data, circa 2000 http://members.tripod.com/druyanov/RDBMS/TestByte.html, 2 pages.*

Datatect brochure, Product Features, Copyright 2003 http://web.archive.org/web/20040405023040/datatect.com/Product/product.htm, 2 pages.*

The Authoritative Dictionary of IEEE Standard Terms, Seventh Edition, cover page and p. 268.*

He, J. and M. Wang, "Cryptography and Relational Database Management Systems," *Database Engineering & Applications, 2001 International Symposium, IEEE*, Jul. 16, 2001, pp. 273-284.

"Oracle9i Replication," Oracle White Paper, Jun. 2001, pp. 1-15.

* cited by examiner

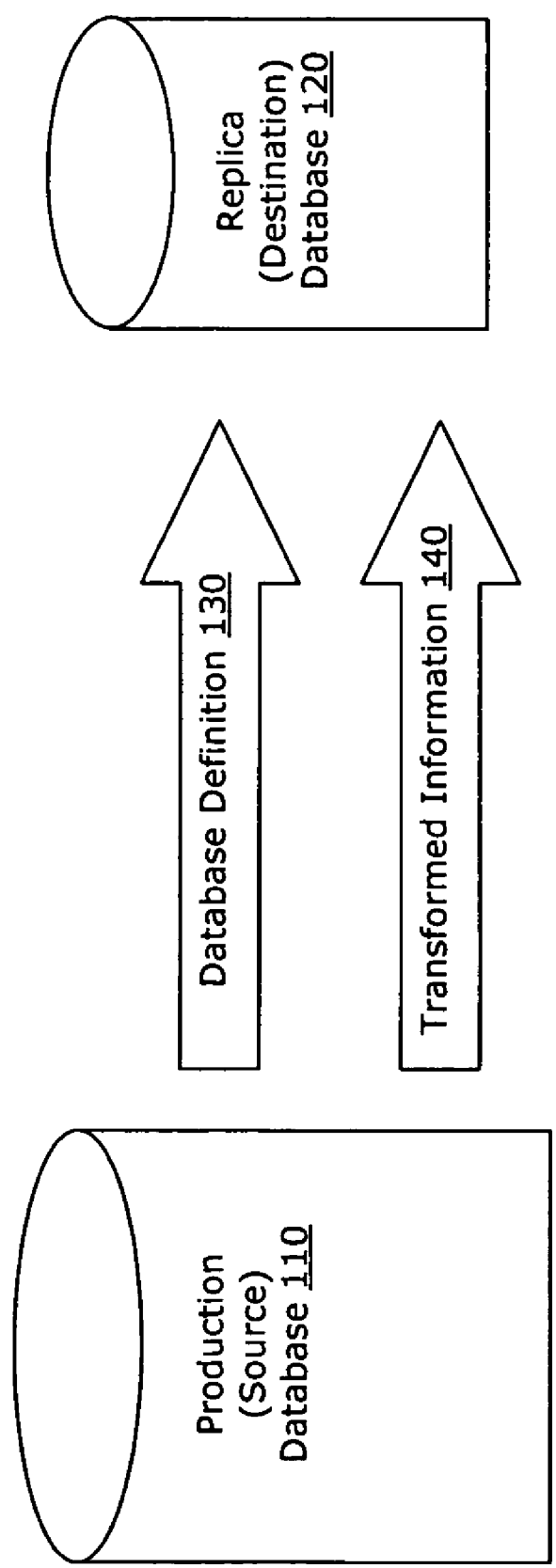
FIG 1. Schematic overview of database replication

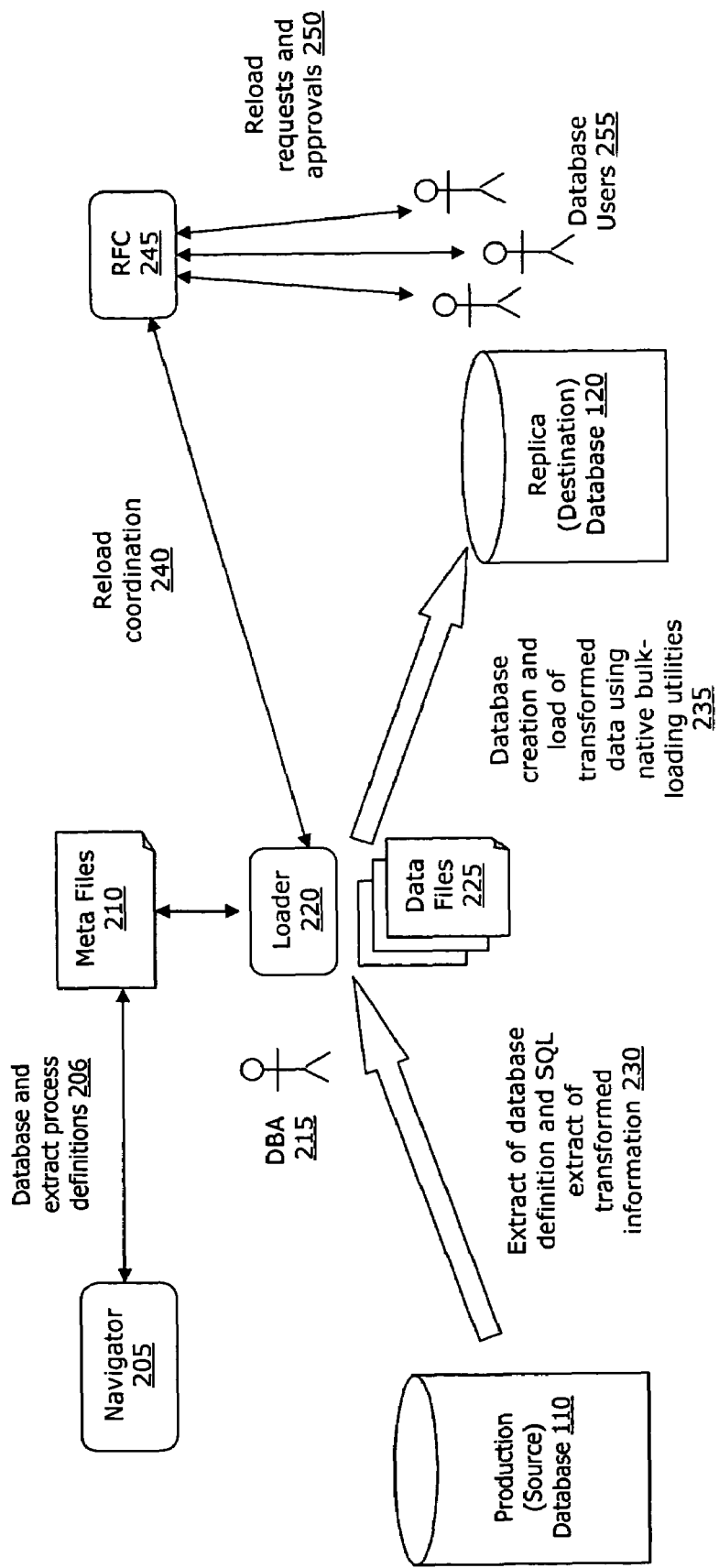
FIG 2. Schematic illustration of one embodiment of the present invention

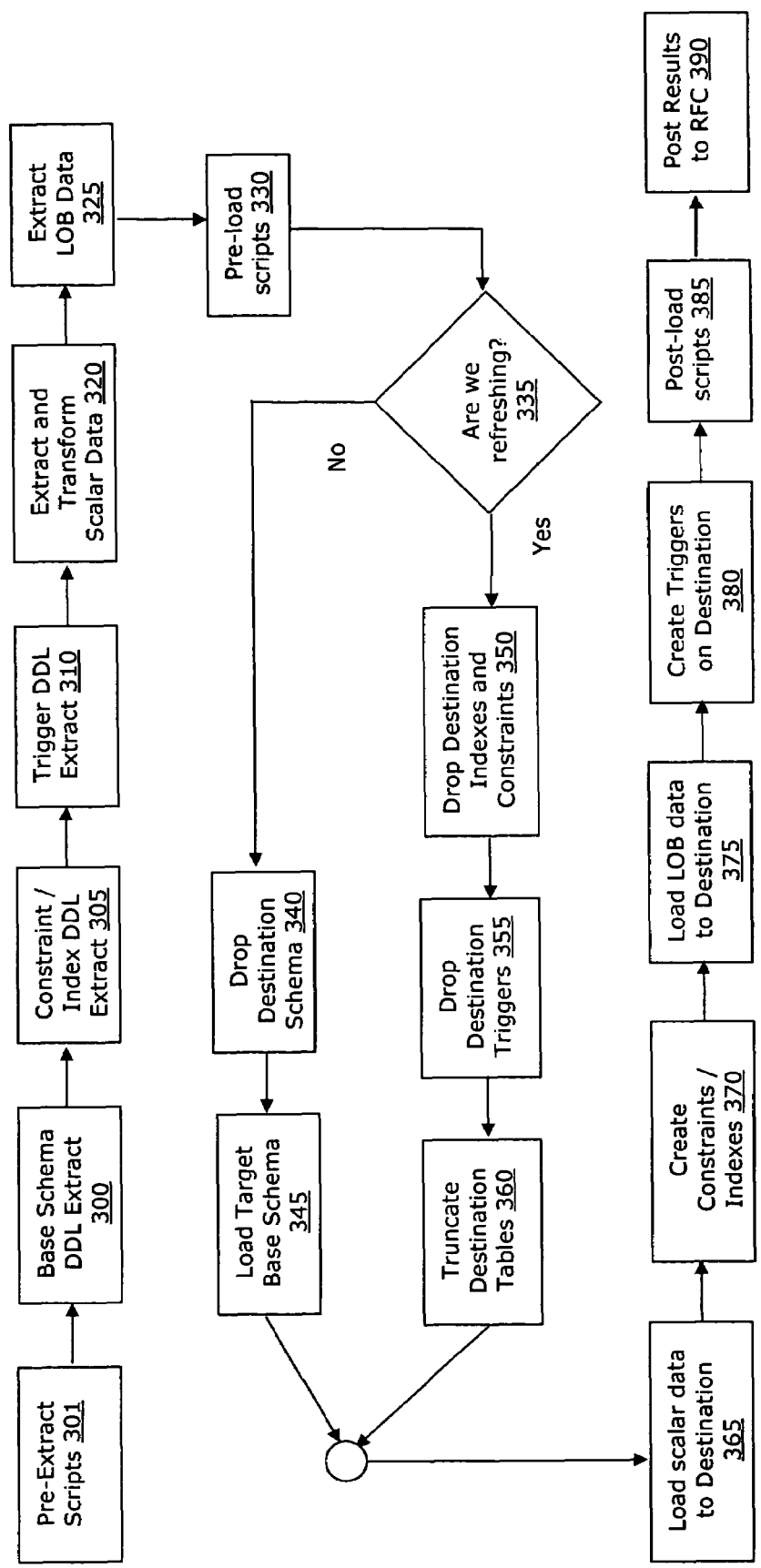
FIG 3. Flow diagram of an extract process

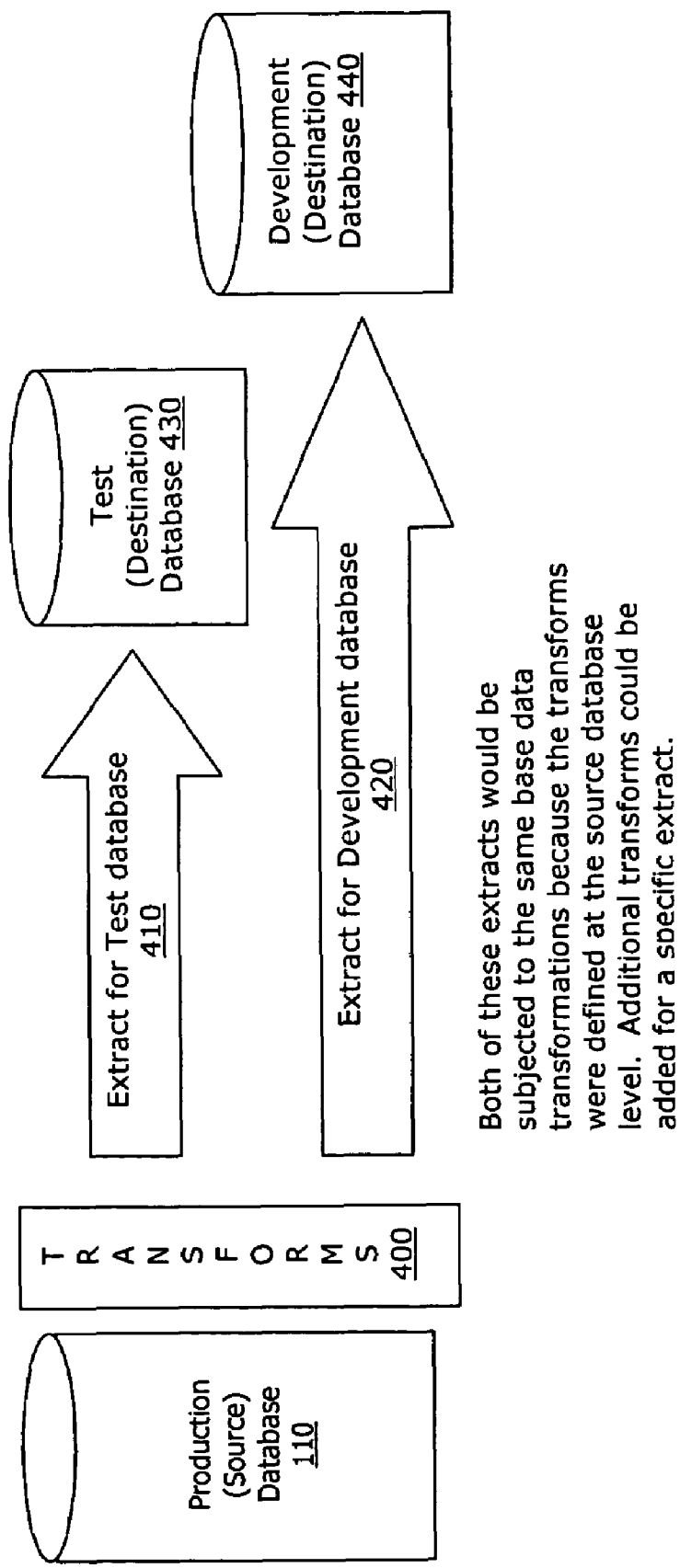
FIG 4. Consistent information transforms

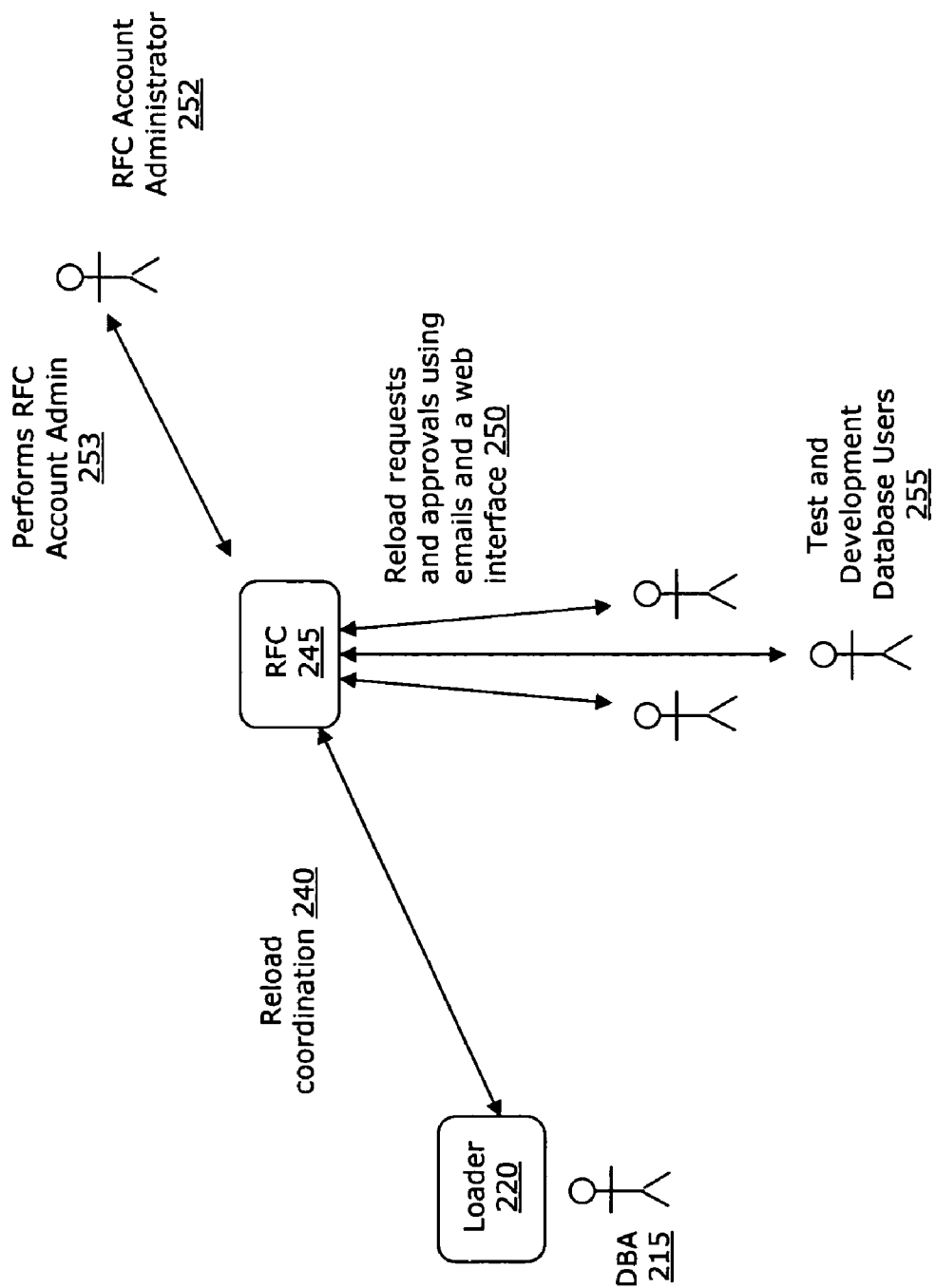
FIG 5. Reload Facilitation Coordinator (RFC) process

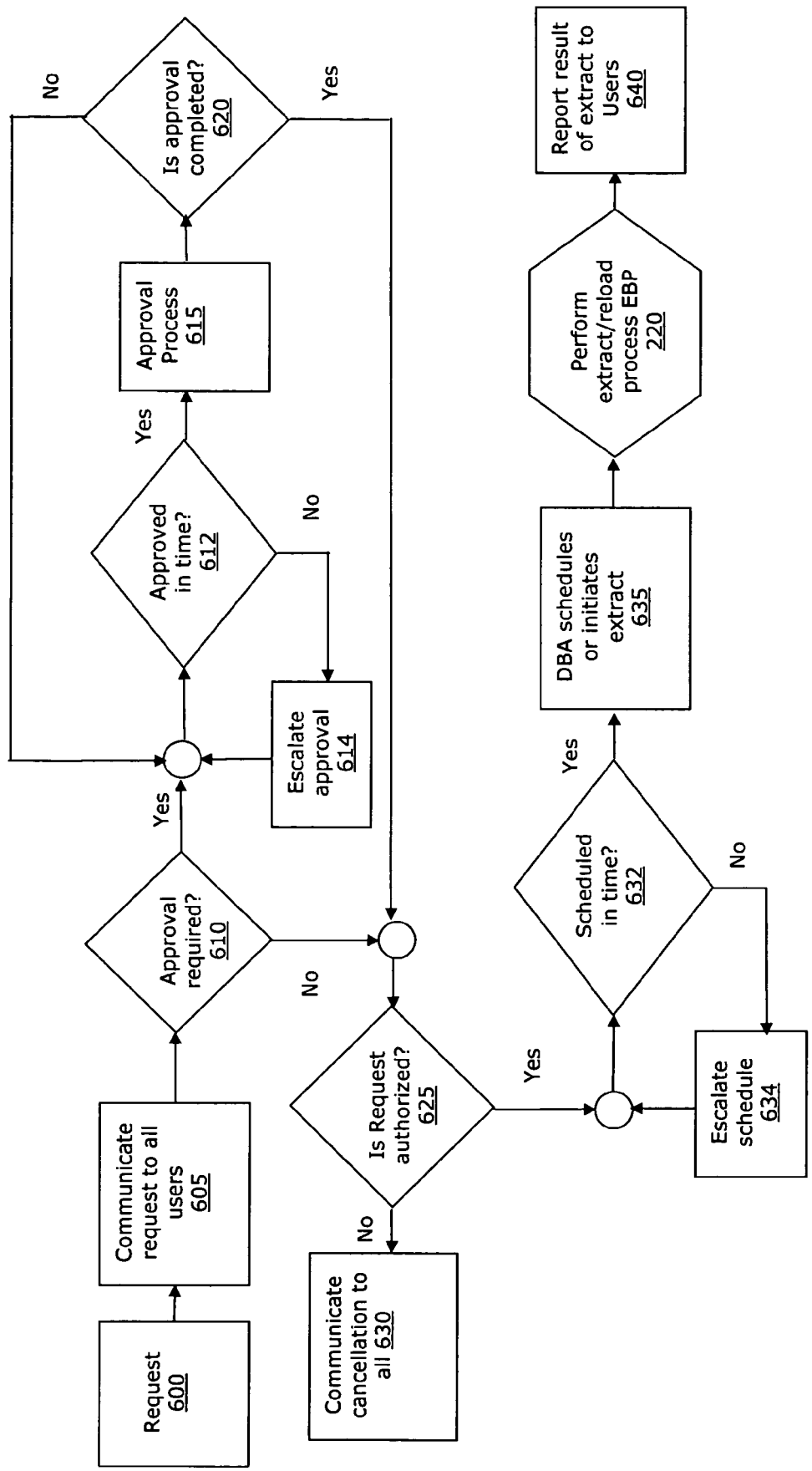
FIG 6. Flow diagram of an RFC process

APPARATUS, SYSTEMS AND METHODS FOR RELATIONAL DATABASE REPLICATION AND PROPRIETARY DATA TRANSFORMATION

RELATED APPLICATION

This application claims the benefit of U.S. Provisional Application No. 60/550,951, filed on Mar. 8, 2004, the teachings of which are hereby incorporated herein by reference.

BACKGROUND OF THE INVENTION

1. Field of Invention

The present invention relates generally to the field of computer system management and in particular, to the automated management of creation test/development databases.

2. Terminology

The following terms are referenced in this document. They are helpful in understanding the context of the document and purpose of the product.

As-Needed

Used in this document to refer to rows in a parent table that relate to dependent rows in a child table based upon physical or logical referential integrity.

Database

A collection of information that is organized so that its contents can be easily accessed, managed, and maintained.

Database Query

A command to a database to select, insert, update or delete some of the data contained within it. Structure query language (SQL) is used to perform database queries. While the different database types have varied underlying structures and processes, all databases process SQL queries. A SQL query that is written following ANSI standards should be able to run on all database types.

DBA

Database administrator—maintains the database.

DDL

Database Definition Language—a script used to define the structural components of a database (e.g., tables, indexes . . . ) but not the data within them.

Destination (Replicate or Target) Databases

These are the databases that are (re)created and/or (re)populated, based on information in a source database, as part of the Present Invention's extract process.

Drop

To drop a database component means to delete it from the database (e.g., you can drop a table in a database if you no longer wish to use it). This is a non-recoverable destructive action, meaning the only way to recover a dropped table is from a prior database backup.

Extract Process

In this document, the term refers to the set of steps involved in replicating a database and/or migration of its data.

Foreign Keys

Foreign Keys are physical constraints in a database used to enforce the referential integrity between two tables. Foreign keys can also exist logically but the referential integrity defined by logical foreign keys must be implemented through the applications that use the database.

LOB

Large Object Binary—A large text or binary object that is placed into the database, such as an image file or a MS Word document.

Masking (Blinding)

See Transform, below.

MIS/IS (Management) Information Systems—This organization, existing within most companies, typically oversees the information maintained by that company's adopted technologies (e.g., relational database systems . . . ).

Parent/Child Relationship

A parent child relationship between two tables indicates how data in these tables is related. The parent record must always exist before the child record does—for instance, the Gender table must contain the entry Male before an entry can be placed into the Employee table, which is related to the Gender table through a foreign key, with a Gender Type of Male.

Primary Key

The combination of one or more columns whose contents uniquely defines a row within a table (e.g., the Client Identification column in a Client table . . . ). While not required, any table containing rows of data that can be uniquely identified should have a primary key.

Proprietary Data/Information

This is information that sensitive. Databases usually contain proprietary business and client information (e.g., client names, pricing data, social security numbers . . . ). This information should be limited to a small number of individuals within the organization and should never be propagated outside of the company. Not only is this information important to the well being of the company but the company also has the responsibility of protecting the client information it maintains.

Referential Integrity

This is the relationship between various tables in a database. This relationship can be defined physically within the database as a set of rules, meaning that any changes made to the data would need to conform to the predefined set of rules in order for the data changes to take place (e.g., each customer must have an address and valid phone number . . . ). The relationship can also be maintained logically through applications that use the database. This is risky since there are ways for users to modify the data in the database directly, without using the application, and get around the rules defined in that application.

Relational Database

A database whose data items are organized in a set of formally described tables from which data can be accessed or reassembled in many different ways without having to reorganize the database tables. Like a spreadsheet, each table is comprised of entries called rows and each row is made up of one or more columns.

Relational Database Vendors/Types

Companies that produce, market, and sell relational databases. Each of these companies has its own relational database type (e.g., Sybase has Adaptive-Server, Microsoft has SQL Server, Oracle has Oracle, IBM has DB2 . . . ). They are also referred to as RDBMS.

Scalar Data

Basic types of data stored in a database such as numbers, character strings, dates, etc. In this document scalar data refers to basic data types but does not include LOB data.

Schema

A schema is a collection of objects within a database owned by a specific user. Typically an Oracle database will contain multiple schemas while Sybase and SQL Server will tend to create separate databases for each "schema".

Source (Production) Database

The source database is what the Present Invention will use to create the destination database. Typically it is a production database in which a company stores its operational information and upon which its runs its applications that use and share that information. Depending upon how their information is segregated, a company may have one or more production databases and these databases may share information between each other.

Table

A table is the basic repository for storing data in the database. For instance, the Client table may hold client information in the database.

Transform

A transform is a function that manipulates the contents of a particular field in the database (also called a column) during the extract process in such a way as to make it impossible to determine the original value. For instance, the "Standard US Phone Number" transform converts the Phone_Number field in a specified table to a random 10-digit string whose first digit is >=2.

Current Manual Process

In a mature area of technology, such as the relational database field, it is surprising how many recurring database operations are still performed manually. One of these operations is the creation of test and development databases. These databases, typically created from a portion of the company's production database, are created to support various teams performing application development, system testing, production support and other related initiatives. This raises two concerns.

First, the overall replication process is usually inconsistent and manually intensive. It requires substantial input and effort from a variety of resources within the MIS/IS organizations. Data requirements for a test database are usually defined by a combination of the business, development and testing groups. Developers then construct the extract process to pull the information out of the production database and then coordinate the creation and/or loading of the test database with the Database Administration group. This costly effort is multiplied by the need for numerous extract processes required to support different initiatives—for instance, development groups need a smaller specific set of data compared to system performance testers who require a large diverse data set, etc. . . . This cost increases when you take into account the process involved in refreshing data into an existing test database and the possibility of "stepping on" someone in the middle of a test. Additionally, because the entire process is manual, the propensity for errors increases.

The second and perhaps more significant concern is the protection of information within the production (source) database. This is often overlooked during the test database creation process. Production databases usually contain proprietary business and client information. This information should be secured and limited to a small number of individuals within the organization and should never be propagated outside of the company. Not only is this information important to the well being of the company but the company also has the responsibility of protecting the client or internal proprietary information it maintains.

While some companies have undertaken the costly chore of building data generation processes to create production-like data sets, this is the exception rather than the rule. Those that have created such processes need to support them because over the life of the database its underlying structure is changing (e.g., new tables created, some table dropped, new columns added, different rules/constraints apply . . . ). Over time this process becomes either unmanageable, expensive or both. For these reasons, most companies simply load their test databases with a copy of their production data, neglecting the fact that the extracted information will now be accessible by a variety of individuals. Why is it done this way? Simple! The extract-method of building test data is usually performed because it is the fastest, most cost effective way to generate a usable form of the database. The production data is already in the appropriate form to support the database's referential integrity requirements. Of course, having multiple copies of a production database is not an efficient use of space, requiring additional storage expenditures. Occasionally, some effort is made to "scrub" the information, such as the removal of credit card information, while other critical information often remains intact, such as client names, addresses, etc. This "scrubbing" is not usually performed in a consistent manner and is typically a manual afterthought, varying from extract to extract.

Test and development databases, shared by a plethora of in-house and external development, integration and testing resources, are rarely afforded the restricted access policies implemented in production environments. With many databases now going overseas to support cheaper application development, there is no telling who now has access to this information and the liability now being opened by these actions. It is reasonable to assume that some of these underpaid resources could profit from either the inadvertent or intentional sharing of this information. In most cases, companies have no ability to prosecute offshore individuals or organizations that share or use their information for personal gain. Never mind the data being appropriated externally, statistically 67% of data stolen from an organization occurs by internal resources.

There needs to be an automated method for creating test databases that incorporate a comprehensive, standardized means of masking the proprietary information, supporting various concerns such as the conventions set forth in the European data privacy laws and the US Safe Harbor rules, while still allowing the applications using the database to operate normally.

The Solution

Present Invention solves these issues and many more. It automates the process of replicating databases. At the same time, it transforms proprietary information as part of the data extract process assuring the security of the data within the database. It even supports the process involved in refreshing test/development database environments.

SUMMARY OF THE INVENTION

The Present Invention data replication and transformation solution:

Creates a replica version of a relational database based upon information obtained from a source database.

Populates the replica database with all or a portion of the data from the source database. If less than or greater than 100% of the source database's data is to be loaded into the replica then the user can:

Indicate the size of the replica database by specifying extract parameters at the database or table levels:

At the schema level the user can specify the size of the replica database as: a percentage of the size of the source database or the user can specify the actual physical size of the replica database (e.g., in megabytes . . . ). A percentage >100% can be specified in order to cause the replica database to contain more data than the source database. The product will automatically figure out how many rows need to be moved from which tables, based upon the source database's physical referential integrity and any logical referential integrity specified by the user.

At the table level, the user can specify the percentage of the table to be extracted, the actual number of rows to be extracted or the filter (e.g., WHERE, PERCENTAGE, ROW-COUNT, ALL, NONE) to be applied as part of that table's extract process.

Indicate if the extracted data should be an evenly distributed sampling of the data based upon each tables primary key. This is valuable in a test environment since the distribution of data in each of the destination tables will imitate that of the source database and assist in detecting hot-spots for collisions, data contention, row/page locking, etc. . . .

Transforms the data during the extraction process using a standardized set of algorithms to keep any proprietary information in the source database from reaching the replica database while still retaining that source database's referential integrity. These transforms can be established at the source database level meaning that all extracts performed against those source databases will have a consistent set of transforms applied during the extract process.

Supports the process of reloading the replica databases interactively or on a scheduled basis running as a batch process.

Coordinates and automates the reload among the various groups of users accessing the replica database.

Supports the addition of new or enhanced transform algorithms through the Present Invention web portal, as they become available.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 1. is a schematic overview of database replication.

FIG. 2. is a schematic illustration of one embodiment of the present invention.

FIG. 3. is a flow diagram of an extract process of the embodiment of FIG. 2.

FIG. 4. is an illustration of consistent information transforms of the present invention.

FIG. 5. is a schematic illustration of the Reload Facilitation Coordinator (RFC) process of the present invention.

FIG. 6. is a flow diagram of an RFC process.

DETAILED DESCRIPTION OF THE INVENTION

FIG. 1 illustrates an overview of replica or destination database 120 generation from a given source database 110. In general, the present invention extracts data definition 130 and transformed information (content) 140 from source database 110 and uses this data to populate and create replica database 120. Further details are explained below with reference to FIGS. 2-6.

The Present Invention consists of the following components illustrated in FIG. 2:

The Database/Extract Configuration Utility (Navigator) 205

This application allows the user to enter and maintain information about the source 110 and destination 120 databases and the extracts processes 230/235. This information is stored in meta files 210. This application also allows the user to navigate through databases residing on various RDBMSs and view information on servers/instances, databases/schemas and database objects.

The Extract Batch Processor (Loader) 220

This application, which may exist in a distributed form, executes the extract processes 230/235 either interactively or on a scheduled basis. These processes a) extract the database definition from the source database, b) transform and extract the data from a source database 110 into flat files 225, c) clear out the destination database of any database objects, d) create a destination database 120 objects and e) load the data from the flat files into the destination database.

An alternate implementation allows the data to be loaded between databases using SQL statements. For schemas within the same instance the tables can be created in the destination database 120 as SELECTs from the source database 110. For schemas that are not in the same instance, the same logic can be employed through the use of external database links.

The Reload Facilitation Coordinator (RFC) 245

The RFC is a web-based portal or client/server application that coordinates the process of reloading test/development databases between the various groups of database users 255 using those databases. It accepts reload requests from these users, performs the appropriate (user defined) reload authentication and approval process—thus ensuring all database users approve the reload and/or are aware of its timing—and interacts with the Loader 220 and DBA 215 to perform the reload (240).

From a process standpoint the following steps are taken
1. Using the Navigator 205 the user enters information about
  a. The source and destination databases (e.g., authorized user id/password . . . )
  b. The source database's configuration information, such as default transformations and logical foreign key information
  c. The extract processes, including the source database, the amount of data to be replicated to the destination database, any additional transforms, etc. . . .
2. Once the information is provided the user (typically a DBA 215) can run the Loader 220 to execute an extract process interactively or schedule an extract to be run at a more convenient time (e.g., off hours). The Loader 220 can also interact with the RFC 245 to coordinate the refresh of a destination database based upon requests from the various groups of users accessing that database.

An extract process performs the steps as displayed in FIG. 3 and detailed below.

Certain extract process configurations may cause one or more of these steps to be skipped.

Further Details

The following sections provide further details on the processes outlined above.

Configuring

The Navigator 205 allows the user to specify configuration information for

1. General options—used to configure miscellaneous default settings and tailor the Navigator 205 application for the user's environment
2. Source/Destination database settings
3. Extract Processes This information is viewed and maintained through an intuitive graphical user interface that incorporates data-entry wizards, as needed, to simplify the process.

General Options configuration values include

| Parameter | Valid values | Notes |
|---|---|---|
| Relational Database Type | A list of relational databases that the user's workstation is licensed to use (e.g., Oracle, MS SQL Server . . . ) | |
| Meta information subdirectory | The name of the subdirectory holding all of setup and extract process .XML definition files | |
| Default Extract Delimiters and SQL Terminators | The default extract delimiters for rows and columns, which can be overridden at the extract level, and the SQL terminators (e.g., "go" for Sybase, ";" for Oracle . . . ) | See notes specified above. |
| DDL Viewing Tool | By default the tool is used to view any extracted DDL although another tool can be specified. | |
| Custom transformation algorithms/definitions | Allows the user to define their own data transformations to be used in the extracts | |

Configuration information for the source and destination databases includes:

| Parameter | Valid values | Notes |
|---|---|---|
| RDBMS | This is selected from the list of available relational database types licensed to the user's workstation (e.g., Oracle, MS SQL Server, Sybase, etc . . . ) | A user may buy licenses for Present Invention Product for one or more RDBMSs. |
| Server Name | This is selected from a drop down box that is populated with the server name referenced in the configuration files of specific RDBMS's client software (as installed and configured on the user's workstation) | Notes on the configuration of specific database's client software: Each relational database resides on a server and that server has a name. This is the name by which the user references that database server from their workstation. Each database server type (e.g., Oracle, Sybase . . . ) has client software that must be installed on the user's workstation prior to interacting with a database of that type. This client software allows the user to specify the names and locations of servers that want to access, which is then stored in a configuration file on that workstation (i.e., TNSNAMES.ORA for Oracle, SQL.INI for Sybase . . . ) This appropriate client software must be in place and properly configured in order to make databases of that type accessible by the Present Invention. The Present Invention uses the client software configuration files to provide users with a list of valid server names. |

-continued

| Parameter | Valid values | Notes |
| --- | --- | --- |
| Connection information | User name and password | Authorized users on the source and destination databases. |
| Destination Authorization | A true/false value. This authorization must be set to true in order to allow the database to be selected as a destination. | This helps to ensure that product never overwrites the source database - such as a production database. |
| Database/schema name | The name of the database or schema owner | For source databases, these values are selected from a list. For destination databases, the name can be selected from a list or provided manually. |
| Logical Foreign Key information | This is a list of relationships between tables that is not stored in the database (the database stores physical Foreign Keys - the user does not need to maintain any configuration information for these), which are entered in the form: Parent Table/Parent Table Unique Key related to Child Table/Child Table Column(s) | This information is provided by the user manually for databases whose referential integrity is non-existent or incomplete or implemented logically through the applications that access that database. This information is only required for source databases. |
| Default transformations | Indicates which columns in which tables are to be transformed and the standard algorithms (i.e., generated phone number, generated price value within a specific range . . . ) are to be applied. | This information is applied to any extract process that is created using this source database. This information is only required for source databases. |

Once the source and destination databases are configured, the user can create extract processes. Again, this is done through a wizard type of interface. The information the user specifies for an extract process includes:

| Parameter | Valid values | Notes |
| --- | --- | --- |
| Extract process file name | The name of the file storing the information about the extract. | An .XML file |
| Description | A description of the process that allows the user to provide any notes, comment. | |
| RDBMS | This is selected from the list of available relational database types licensed to the user's workstation (e.g., Oracle, MS SQL Server, Sybase, etc . . . ) | See notes specified above. |
| Source database 110 | As selected from the set of pre-defined databases based upon the relational database type selected. | |
| Destination database 120 | As selected from the set of pre-defined databases (that are authorized to be destination databases) based upon the relational database type selected. | |
| Extract process type | The user selects from an a-la-carte set of options. | Options include Refresh destination database and data (drop and recreate schema, load data) Refresh destination database only (drop and recreate schema - no data) |

-continued

| Parameter | Valid values | Notes |
|---|---|---|
| | | Refresh data from source (truncate tables and reload with source database extract) |
| | | Refresh data using previously extracted files (truncate tables and reload with data files from a prior production extract) |
| Source login and password | The connection information is provided, based upon the selected database. | The password value is encrypted on the screen and in the meta file. |
| Destination login and password | The connection information is provided, based upon the selected database. | The password value is encrypted on the screen and in the meta file. |
| Size of extract | The user has several options from which to select<br>The user can specify the % of the source database - this process is described in further detail in a later section.<br>The user can specify the size of the extract (e.g., in megabytes . . . )<br>The user can specify a custom table extract by specifying table level parameters for each table | When percentages or sizes are specified the application will use the foreign key information (garnered from the source database or provided manually as part of the source database configuration) to calculate the driving tables in the database (those tables which have no children and one or more parents) and determine the number of rows to be selected from this table and related tables to meet the specified extract percentage.<br>Custom selection is supported using table-level filters, which include:<br>PERCENT - The percentage of the table to be extracted OR<br>COUNT - The number of rows to be extracted OR<br>WHERE - A SQL clause indicating the filter to be applied to the table as part of the extract OR<br>AS NEEDED - takes into account referential integrity between the other tables and only includes those rows required by the other tables OR<br>ALL - will cause all rows to be selected OR<br>NONE - will cause no rows to be selected<br>Note: If the indicator for maintaining referential integrity is selected, some of the filters may be ignored if they would have caused a loss of database referential integrity due to incorrect overlapping logic. |
| Extract specific transformations | Allows the user to specify which columns are to be transformed using the specified standard transform algorithms. | Transformation can be applied at the database level or at the extract process level, or combination of those. |
| Extract specific delimiters | Allows the user to specify terminators that are used to separate rows and columns in the extract data files. | This value can be specified at the extract level on the rare occasion that the default terminators are not sufficient. Native data transfer format can be selected for some RDBMSs, which allows the database to specify the delimiters |
| Minimum number of rows selected | Indicates the minimum number of rows to select from an AS NEEDED table | This is a good way to make sure all rows in most reference tables are included. If the number of rows in a table is less than the specified value then all the rows in the table are included in the extract. Increasing this number can decrease the time required to extract the data by minimizing AS NEEDED extract complexity. |

-continued

| Parameter | Valid values | Notes |
|---|---|---|
| Distribute data evenly | Indicates if the extracted data is to be evenly distributed in a similar fashion to the data in the corresponding source table | Extracting 10% of a table that is not evenly distributed will result in taking the first 10% of the rows in that table. If evenly distributed then every $10^{th}$ row would be selected. |
| Maintain referential integrity | Indicates if referential integrity is to be maintained in the extracted data | Selecting to not maintain referential integrity will prohibit foreign keys from being applied to the destination database (in addition to affecting which data is extracted from the source database) |
| Exclude objects | The user may select to exclude certain types of objects from being extracted and loader. | The list of types is RDBMS specific and can include clusters, foreign keys, functions, procedures, packages, package bodies, materialized views, tables, triggers, views, users, roles, grants, synonyms, java sources, snapshots, snapshot logs, sequences, user types, etc . . . |
| Database storage | Tablespace, segment, filegroup, etc, mapping | For instance, In Oracle, all table data could be mapped to one tablespace and all indexes could be mapped to another OR each tablespace on the source database could be mapped to a different tablespace on the destination (thus supporting local table administration - if desired). |
| Use Zip files | Extracted data could be compressed into zip files (or extracted from zip files) | Good for shipping to outsource vendors |
| Load structures from XML files | Allows the user to load database information from XML files instead of the source database | This can speed up the extract process - depending upon the size of the source database. |
| Data and Working directories | Allows the user to specify a location to place the extracted DDL and data files. | By default this field is a generated name consisting of "c:\ProductName\Data\ExtractName", where ProductName is the name of the subdirectory on the workstation into which the product was installed and ExtractName is the file name of this specific extract process. |
| Scripts | Allows the user to specify a location to place the extracted DDL and data files. | Allows the user to specify their own scripts to run during the extract process: Prior to extracting from source Prior to loading on destination After loading on destination |

Extract Process

Once the configuration information is complete, extract processes can be run using the Loader 220.

The extract process is executed as a series of process-steps (as shown in FIG. 3). The set of process-steps to be executed is determined by the extract process type (e.g., create replica database, create and populate replica database, refresh replica database data only . . . ).

The schema/database DDL extract is broken into three steps in order to support an optional data load (although the order is better illustrated in FIG. 3). Prior to running these three steps an optional custom (user defined) Pre-Extract script 301 can be run to prepare the database for the extraction process. These steps include the:

Base Schema/Database DDL Extract (Source) 300—this process extracts the definitions of all of the database objects including the tables, views, procedures, functions, synonyms, Sequences, User Groups, Grants, Defaults, Data Types, Rules, Snapshots, Packages, Snapshot Log (Oracle specific), Aliases . . . —with the exception of the index, trigger, foreign keys and table constraints. Note: Not all object types are valid for all relational database types/versions.

Index/Foreign-Key/Constraints DDL Extract (Source) 305—this process extracts database objects that are data-related including, indexes, foreign keys, table constraints, etc. . . .

Trigger DDL Extract (Source) 310—this process extracts the triggers.

The data extract is performed in two steps, for reasons of throughput and space-utilization efficiency:

Scalar Data Extract (Source) 320—Extracts the source data, while applying the filtering and transformation logic, to flat files LOB Data Extract (Source) 325—Extracts the source LOB data as needed.

The next steps are process related and cleanup database objects and/or data in the destination database:

Pre-load Scripts (Destination) 330—These are user defined SQL queries and scripts that are run at the beginning of the destination load process.

If we are refreshing the entire schema and data within it (335).
  Schema Drop (Destination) 340—drops all of the following objects in the destination database.

If we are refreshing the data in the destination database (335)
  Index/Foreign-Key/Constraint Drop (Destination) 350—drops all of the index and constraint objects in the destination database. This helps enhance load times and removes errors associated with loading tables in the wrong order due to referential integrity.
  Triggers Drop (Destination) 355—drops all of the triggers on tables in the destination database. This helps enhance load times and ensures the triggers will not modify the data as part of the load process.
  Truncate Tables (Destination) 360—clears all of the existing information out of the tables, if any.

The next steps are the load process and always executed in the following order
  Base Schema Create (Destination) 345—Creates the majority of the objects in the destination database so that the data can be loaded into them. This step is only needed if the schema/database drop occurred just prior.
  Scalar Data Load (Destination) 365—load all of the extract data into the corresponding tables in the destination database. Prior to loading any database configuration settings are made (i.e., enable bcp processing in the destination database for Sybase . . . ). The load process will make use of the destination databases native bulk loading utility (i.e., bcp for Sybase, SQL*Loader for Oracle) in order to minimize load times.
  Index/Foreign-Key/Constraint Create (Destination) 370—Creates the database objects that enhance database performance and enforce referential integrity (once the data is in place). During this step, database statistics are updated and other database objects recompiled—in order to help the database make the best query plan selections, for performance reasons.
  LOB Data Load (Destination) 375—loads the extracted LOB information into the destination database. In some databases, where it is possible, LOB Data load might be combined with Scalar Data Load.
  Trigger Create (Destination) 380—Create all of the triggers in the destination database
  Custom Post Load Processing Scripts (Destination) 385—These are user defined SQL queries and scripts that are run at the end of the load process.
  Post Results to RFC 390—Report extract result to Database Users 255

Not all of the steps above are run each time an extract process is run. The process-steps that are run as part of a specific extract process are dependent upon the type of extract process. The table below describes a few of the possible types of extracts that can be run:

| Step | Create Replica Database and Populate from Source DB | Create Replica Database from Source DB (but do not Populate) | Refresh Replica Database Data from Source DB | Refresh Replica Database Data from Prior Extract |
|---|---|---|---|---|
| Custom Pre Extract Processing Scripts 301 | 1 | 1 | 1 | |
| Primary Schema/Database DDL Extract 300 | 2 | 2 | | |
| Index/Foreign-Key/Constraint DDL Extract 305 | 3 | 3 | | |
| Trigger DDL Extract 310 | 4 | 4 | | |
| Scalar Data Extract 320 | 5 | | 2 | |
| Custom Pre Load Processing Scripts 330 | 6 | 5 | 3 | 1 |
| Schema Drop 340 | 7 | 6 | | |
| Index/Foreign-Key/Constraint Drop 350 | | | 4 | 2 |
| Trigger Drop 355 | | | 5 | 3 |
| Tables Truncate 360 | | | 6 | 4 |
| Schema Create 345 | 8 | 7 | | |
| Scalar Data Load 365 | 9 | | 7 | 5 |
| Index/Foreign-Key/Constraint Create 370 | 10 | 8 | 8 | 6 |
| LOB Data Extract 325 | 11 | | 9 | 7 |
| LOB Data Load 375 | 12 | | 10 | 8 |
| Trigger Create 380 | 13 | 9 | 11 | 9 |
| Custom Post Load Processing Scripts 385 | 14 | | 12 | 10 |
| Post Results to RFC 390 | 15 | | 13 | 11 |

If the user selects an extract process that refreshes only the data in the tables from the source database 110 then a schema comparison is performed to ensure no changes have been made to the database's underlying structures since the last extract and load process. If any differences are detected (e.g., tables exist in the source but not the destination, columns exist in the source or destination that do not exist in the other, columns types differ . . . ) the user is warned and instructed to perform a schema refresh.

User may create two separate extracts; One for source information extract, and second one for destination load. This allows performing extract when source and destination servers are not reachable at the same time. It allows creating a snapshot of information frozen in time that can be loaded into a destination database at a later time.

The Loader 220 can run on a user's workstation or as a process on a server. Running on the server will reduce network traffic and take advantage of the server's hardware but requires additional configuration. Also, the extract process can be run interactively, on a scheduled basis, or in a batch mode.

EXAMPLE EMBODIMENT 1

Summary

The Present Invention's extract process:
Extracts information from a source database so that it can be loaded into a destination database including
Database objects including tables, views, procedures, functions, etc.
Data
Incorporates standardized data transform algorithms (SDTA) as part of the extract process that
Convert database columns containing typical proprietary business data (e.g., credit card numbers, client names, phone numbers . . . ) into columns containing ordinary or generated data
Incorporate database-specific techniques, system functions and native utilities into the extract process in order to provide efficient data extraction and transformation
Achieve the data transformation in the source database, without the need to first extract the proprietary data, through the use of generated SQL queries
Allow the destination database to retain the source database's referential integrity Detail These points summarize the logic implemented in the database object extract, data extract and transformation processes:

1) Database DDL extraction and Load
   a) The Present Invention performs extracts of the source database's DDL (data definition language) for use in generating a destination database. The DDL is generated using information in the source database's system catalog.
   b) The DDL extracts and loads are broken into three steps in order to support efficient destination database creation and data loading. These steps include the following DDL extracts.
      i) Base DDL —this is the majority of the database DDL (with the exception of indexes, triggers, foreign keys and table constraints). It is loaded into the database as the first step of the load process.
      ii) Index and Constraint DDL—The index and constraints (table/column constraints and foreign keys) are applied after the scalar data is loaded. This helps the performance of the load, alleviates the need to load data in any specific order, and supports the LOB load process.
      iii) Trigger DDL—this is applied last in the load process after all scalar and LOB data is loaded
2) Data extraction, transformation and load
   a) Data extracts are performed from the source database using dynamically generated SQL queries, the output of which is formatted into delimited flat files, which is then loaded into the destination database using the specific RDBMS's native bulk loader (e.g., bcp for Sybase, SQL*Loader for Oracle . . . ). Note: the native bulk loaders are typically the fastest way to load flat-file information into a database.
   b) The generated SQL queries incorporate column transformation logic as well as logic necessary for determining which rows should be extracted from the source database.
   c) The data transformation is defined by assigning a SDTA to a specific database/owner/table/column combination, which the user has determined to contain proprietary information, as part of the source database or extract process configuration.
   d) SDTAs are transforms that are defined in terms of typical business types in order to make column masking easy for the user (e.g., requiring no coding experience). For instance, fields containing client phone numbers can use SDTAs such as "Random US Phone Number" or "Random European Phone Number".
   e) Each SDTA will follow a specific transformation algorithm, which defines how the existing data will be manipulated, if at all, and combined a generated random value, if appropriate, to produce a suitable transformed data value.
   f) The transformed data value will be consistent with the original data column's type, meaning a field that held a phone number should hold a random phone number once transformed.
   g) If the table/column combination to be transformed is part of a foreign key then both the parent and child components of the key with have their corresponding columns transformed in a consistent manner, thus preserving the referential integrity between the two tables. This is accomplished by
      i) Determining if a column that is transformed is part of a foreign key
      ii) Traversing down and up the table hierarchy trees to make sure all columns related by foreign keys (physical and logical) are set to the same SDTA (if multiple SDTAs are selected for a set of columns that are related in this manner then the first SDTA detected will be considered the dominant selection and supercede all others).
      iii) Building a temporary mapping table at the highest level in the table hierarchy trees that holds the unique set of values and the newly generated value (e.g., if numeric then start at one and generate an increasing value; same thing for characters but convert the number to a character string, for dates, start at a specific date and increase the date by some small interval of time, based upon the number of records in the table, for each record). Use the number of the table and the number of the column to create a uniquely named mapping table.

iv) Build a corresponding unique index on the original value column on this temporary table to speed transformation during the data extraction.
v) Add this temporary table to the final selection clause of any table that references this masked foreign key, and join to it using the original value to get the generated value.
vi) All of these temporary tables will be cleaned up once all of the tables in this specific hierarchy tree have been traversed/processed during data extract processing.

h) Transformation logic will be implemented in the SQL extract queries using database specific techniques and system functions for performance reasons.

i) While not all future transformations can be predicted as this time, the initial column transformation algorithms, each of which will support one or more transforms, are listed in the table below by database type. This table will expand and its contents will be amended as additional transforms/techniques are needed and as additional database types are supported:

| Algorithm | Example Transforms | Sybase/MS-SQL Server | Oracle |
|---|---|---|---|
| Random Integer (within a range) | Random Integer Random Age | Convert (int, (($@max\_value - @min\_value) * (rand (@seed\_column\_name))) + @min\_value) | Select round (((($@max\_value - @min\_value) * abs (dbms\_random.random/ 2147483647)) + @min\_value) |
| Random Floats (within a range) | Random Price | Convert (numeric (16, @precision), (($@max\_value - @min\_value) * (rand (@seed\_column\_name))) + @min\_value) | Round (((($@max\_value - @min\_value) * abs (dbms\_random.random/ 2147483647)) + @min\_value, @precision) |
| Fixed String (Fixed length) | Mask Text (fixed character, fixed length) | Replicate (@filler\_character, @column\_length) + @column\_terminator | Lpad (@filler\_character, @column\_length, @filler\_character) |
| Fixed String (Varying length) | Mask Text (fixed character, varying length) | Replicate (@filler\_character, datalength (rtrim (@column\_name))) | Lpad (@filler\_character, length (@column\_name), @filler\_character) |
| Random String (Fixed length) | Mask Text (random character, fixed length) | Replicate (char ((26 * (rand (@seed\_column\_name))) + 65, @column\_length) | Lpad (@filler\_character, @column\_length, rchar) Note: rchar comes from an additional table in the FROM clause: (Select chr (round ((26 * abs (dbms\_random.random/ 2147483647)) + 65)) as rchar from dual) |
| Random Integer (within a range) | Random Integer Random Age | Convert (int, (($@max\_value - @min\_value) * (rand (@seed\_column\_name))) + @min\_value) | Select round (((($@max\_value - @min\_value) * abs (dbms\_random.random/ 2147483647)) + @min\_value) |
| Random Floats (within a range) | Random Price | Convert (numeric (16, @precision), (($@max\_value - @min\_value) * (rand (@seed\_column\_name))) + @min\_value) | Round (((($@max\_value - @min\_value) * abs (dbms\_random.random/ 2147483647)) + @min\_value, @precision) |
| Fixed String (Fixed length) | Mask Text (fixed character, fixed length) | Replicate (@filler\_character, @column\_length) + @column\_terminator | Lpad (@filler\_character, @column\_length, @filler\_character) |
| Fixed String (Varying length) | Mask Text (fixed character, varying length) | Replicate (@filler\_character, datalength (rtrim (@column\_name))) | Lpad (@filler\_character, length (@column\_name), @filler\_character) |
| Random String (Fixed length) | Mask Text (random character, fixed length) | Replicate (char ((26 * (rand (@seed\_column\_name))) + 65, @column\_length) | Lpad (@filler\_character, @column\_length, rchar) Note: rchar comes from an additional table in the FROM clause: |

-continued

| Algorithm | Example Transforms | Sybase/MS-SQL Server | Oracle |
|---|---|---|---|
| Random String (Varying length) | Mask Text (random character, varying length) | Replicate (char ((26 * (rand (@seed_column_name))) + 65, char_length (rtrim (@column_name))) | (Select chr (round ((26 * abs (dbms_random.random/ 2147483647)) + 65)) as rchar from dual) Lpad (@filler_character, length (@column_name), rchar) Note: same as entry above |
| Random String containing numeric with leading zeroes | Random SS# Random Zip Code Random Empl. Id Random Federal Id | Right (Replicate ('0', @column length) + convert (varchar, convert (numeric (@column_length, 0), (rand (@seed_column_name) * @max_value − @min_value) + @min_value)), @column_length) | Lpad (to_char (round (((@min_value * abs (dbms_random.random/ 2147483647)) + @max_value, 0)), @column_length, '0') from dual |
| Random string containing numeric integer > 4bytes in length bytes in numeric value) | Random Phone | Convert (varchar, convert (numeric (10, 0), (rand (@seed_column_name) * @max_value) + @min_value)) | To_char (round (((@max_value * abs (dbms_random.random/ 2147483647)) + @min_value, 0)) |
| Random Code from a fixed set of codes | State Cd (in the example to the right I generate a code between 01 and 50 - similar to a state code generation) | Substring ('01020304050607080910 11121314151617181920 21222324252627282930 31323334353637383940 41424344454647484950', convert (int, rand (@seed_column_name) * @Number _Of_Codes) * @Code_ Length + 1, @Code_Length) Note: as an optional implementation a temp code table could be generated and joined to the extract table using a randomly generated key value. | Substr ('01020304050607080910 11121314151617181920 21222324252627282930 31323334353637383940 41424344454647484950', round ((@Number_Of_Codes * abs (dbms_random.random/ 2147483647)) * @Code_Length + 1, @Code_Length) |

Special notes
All of the variable columns above (prefixed with a @) would need to be defined
The seed column can be a numeric primary key, a generated identity column, etc . . .

For instance, if we had an employee table in a Sybase database that held an employee's id, name and phone number and we wanted to transform the phone number during the extract process because we considered it proprietary information, the following SQL would be generated to extract the employee table information from the source database:

```
SELECT  employee_id
     ,  employee_name
     ,  Convert (varchar, convert (numeric (10,0), (rand
(employee_id) * 7999999999) + 2000000000))
        FROM EmployeeTable
```

EXAMPLE EMBODIMENT 2

Summary

The ability to configure default standardized data transform algorithms (SDTAs) at the database level ensures all extracts performed from the source database 110 adhere to the standard set of data transformations and provide consistent protection of proprietary data. FIG. 4 illustrates multiple extracts being performed from a single database/schema with consistent data transformation to respective destination databases 430/440.

Detail

1) Each source database 110 must be defined in the Present Invention prior to using it as an extract 2) As part of the database configuration, SDTAs can be assigned to any column in any table 3) Subsequent extract processes 230/410/420 for that source database will incorporate these transforms into the default set of transforms performed by that extract.

4) This ensures a consistent set of data transformations 400 will be applied to any extracts 230/410/420 performed against that source database 110 thus addressing the concerns associated the inconsistency of manual extracts.

5) Future modification to source schema 110 would not affect the extract process. Transformation algorithms 400 will adjust to incorporate additional information.

EXAMPLE EMBODIMENT 3

Summary

The implementation of an algorithm for selecting an evenly distributed sampling of information from a source database table, based upon the composition of the table's primary key and the percent of data to be extracted from that table, allows the extracted data to reflect the distribution of information within the source database while also supporting bulk data extraction techniques.

Detail

This is especially useful for mimicking the data distribution of the production database tables in a smaller test environment in order to research hot spots for collisions, data contention, row/page locking and other issues related to the distribution of data within tables.

1) The following is the logic used to determine an evenly distributed sampling of data, the method of employing it logically and some examples of physical implementation (which differ from database type to database type):
   a) Logic
      i) Information is logically distributed in a table based upon each row's primary key (or alternately, its unique index)
      ii) The logic of "graphing" the distribution of entries in a table is accomplished by ordering the rows in the table based upon the value of their primary key, running each row's row number across the X-axis (from 1 to the number of rows in the table) and graphing the primary key's value on the Y-axis. This same logic can be applied to the physical distribution of data in the tables.
      iii) Once ordered, a subset of the rows can be extracted from the source table having the same logical distribution as the set of all rows in the table. This subset is formed by extracting N out of every M rows from the source table, where N and M are determined based upon the percentage of data being extracted. N and M may consist of single values or groups of values, depending upon the complexity of the percentage calculation.
         (1) For simple percentages, such as 10% of the table, we want to take 1 out of every 10 rows (N=1 and M=10); for 75% of the table, we want to take 3 out of every 4 rows (N=3, M=4), etc. . . .
         (2) For more complex percentages, such as 37% of the table, we need to build a map that indicates which of the rows should be selected. Exactly specifying which 37 rows out of each group of 100 rows should be selected provides the best distribution of data but requires costly calculations. Converting this complex formula into multiple simplified formulas provides the same results and reduces the required processing as long as the results sets are disjoint subsets whose union is equivalent to the result of the complex calculation. The simplified union logic will achieve the same results as the same complex logic, albeit with a slightly less than perfect distribution. For instance formulas for 1 out of 3 and 1 out of 25 provide disjoint result sets containing 33 and 4 members respectively, thus providing a distributed set of 37 rows out of every 100.
         (3) The logic employed in the Present Invention extract process combines the logic in the two proceeding steps based upon the percentage of data to be extracted from the source table.
   b) Logical Implementation
      i) Each table in the source database has its own set of SQL queries associated with the extract of its data
      ii) The first SQL query selects the set of all primary keys in the source table in an ascending order and then assigning them a corresponding unique increasing numeric alternate key (e.g., 1,2,3 . . . Z, where Z is the number of rows in the source table)
      iii) The next SQL query joins the results of the first SQL query (RFSQ) to the source table (ST) and specifies all rows in the ST having the same primary key as those in RFSQ and have a unique increasing numeric alternate key whose value fits into the formula above, implemented using modular logic, should be included in the final result set.
   c) Physical Implementation—a couple of simplified examples to show just the distribution process (without formatting, null processing or data transformation)
      i) Sybase—selecting 20% of the rows from the table t_xr_test whose primary key is user-id
         Step 1—build RFSQ as a temp table (taking advantage of minimal logging and RAM usage)

```
SELECT n=identity (8), user_id
INTO #temppks
FROM t_xr_test
ORDER BY user_id
```

Step 2—extract the result set

```
SELECT t2.user_id, t2.last_name, t2.first_name
FROM #temppks t1, t_xr_test
WHERE (convert (int, t1.n) % 5) and t2.user_id = t1.user_id
``` ii) Oracle—selecting 20% of the rows in a table in a evenly distributed sampling
         Step 1—extract the result set (build RFSQ as part of a SELECT in the FROM clause)

```
SELECT t2.user_id, t2.last_name, t2.first_name
FROM testdb.t_xr_test t2
 , (SELECT rowum as myrownum, user_id FROM
    (SELECT user_id FROM testdb.t_xr_test ORDER BY user_id
ASC)) t1
WHERE mod(t1.myrownum, 5) = 0 AND t2.user_id = t1.user_id
```

EXAMPLE EMBODIMENT 4

Summary

Present Invention is able to determine which data needs to be extracted from the source database in order to meet the extract size or percentage requirements that are defined at the database level while retaining the referential integrity of the extract. This is accomplished using the source database's definitions for physical and/or logical (including logical relationships defined by the user using the Navigator) referential integrity.

Detail

The following process is used to determine which rows will be selected from each of the source tables:

1) Get the extract sizing parameters defined at the database level
   a) The extract type, which is either
      i) Percentage—indicating the % of the source table to be extracted
      ii) Size—indicating the size in Megabytes of the source table to be extracted
      iii) Custom—filters are provided at the table level
   b) The extract value (percentage/size)—The percentage or size of the extract. For instance, if the extract type is percentage then this value specifies what percentage of the source database the replica database will be. If the extract type is size then this specifies the size of the replica database in Megabytes. For Custom extracts, these values are specified at the table level.
2) Build a list containing the following information for each table in the source database:
   a) The table owner
   b) The table name
   c) The number of parent relationships that table has with all other tables (physical and logical)
   d) The number of child relationships that table has with all other tables (physical and logical)
   e) The number of rows in the table
   f) A flag indicating if data should be extracted in an evenly distributed sampling that matches that of the table in the source database (referred to as the "even-distribution flag").
3) Automatically determine driving tables, which are those tables in the source database for whom filtering is applied in order to limit the data extracted from these tables and whose selected results drive the selection from the remainder of the tables in the source database based upon the table relationships, and their filter types of these driving tables based upon the type of data filtering imposed on the extract, such that
   a) For schema—level filtering, the driving tables are automatically determined based upon the table relationships within the source database, the relationships are based upon physical referential integrity defined through foreign keys along with any logical referential integrity defined in the Navigator. Tables representing leaf-level nodes in the table hierarchies, which are those with parent relationships but no child relationships, are designated as the driving tables with a PERCENT filter type, which indicates what percent of the rows in the table are to be extracted and a percent_of_extract value equivalent to the extract percentage set at the schema level.
   b) For custom-level filters, the driving tables are determined as those tables for which filter criteria is specified in the form of either a
      i) WHERE clause, to be incorporated into the SQL statement selecting rows from that table
      ii) COUNT, indicating the number of rows to be selected from that table
      iii) PERCENT, indicating what percent of the rows in the table are to be selected
      iv) ALL indicator, specifying all rows will be selected from that table
      v) NONE indicator, specifying no rows will be selected from that table.
4) Build a set of table hierarchies, which describe the relationship between the tables in the source database, and associated attributes that will help expedite data extraction by driving an efficient ordering of the table extracts.
   a) Start by determining leaf level nodes in the hierarchies, which are those tables that have parent relationships but no child relationships.
   b) The hierarchies are then built by starting at the leaf-node tables and traversing up, based upon each tables related parent tables.
   c) Once built, the hierarchy is then traversed from the bottom up to establish
      i) Which hierarchy, if any, each table belongs to
      ii) Each tables depth in the hierarchy (relative to the maximum depth of any of its children)
      iii) the existence of tables containing self-joins or circular references to any other tables so they an be handled appropriately during the extract
5) Determine the need for any Masked Foreign key mapping tables
   a) Begin by ensuring that all related tables associated by a specific column will have the same mask on all related columns, for instance—if a fund_nbr and parent_fund_nbr columns appear in two separate tables and both of these columns have foreign key relationships to a fund_nbr field in a fund table and one of these columns has a mask assigned to it then that same mask needs to be assigned consistently to each of these columns because they are all related. This is accomplished by
      i) Building a list of all the masked columns
      ii) For all of the masked columns that are in foreign keys
         (1) Set the corresponding column in the primary table to have the same mask as the column in the foreign table.
         (2) Traverse down the table hierarchies to see if any other related columns need to be set to the same mask
   b) Perform the same process by traversing up the table hierarchies and making sure all related table/columns have the same mask applied.
   c) For the highest level column in the relationship hierarchy, create a temporary lookup table based upon the set of unique values that includes a generated transform value, as defined in Example Embodiment 1
6) In the event table-level filters are defined
   a) The hierarchy will be traversed from top to bottom in order to specify the WHERE clause of any tables that exist below a driving table in a given table hierarchy. These tables will inherit the WHERE clause of any related driving table that exists above them in the hierarchy and any joins (FROM/WHERE clauses) generated to support the associated foreign keys.
   b) Now determine which tables have rows that will be selected on an as AS-NEEDED basis. Only the tables that have a parental (e.g., parent, grandparent, etc . . . ) relationship to any of the tables touched in the top-down traversal will be selected. The remainder of tables will be filtered so that no rows are selected.
7) Next we perform the actual data extraction, as follows
   a) Traverse each of the table hierarchies in order to best utilize the system resources on the source database server in an efficient manner in order to expedite the bulk extraction of referentially intact data set, by
      i) Traverse each of the tables in the table hierarchy from the bottom up, starting at level 0 in the hierarchy and traversing all the way through all tables at that level and then progressing to the next highest level, up to the highest point in the hierarchy (note—tables with no referential integrity have a hierarchy level of zero).
(1) Extract data based upon the table's filter type
   (a) If PERCENTAGE is specified
      (i) If the evenly-distributed-data flag is set
         1. Use the logic defined in Example Embodiment 3
      (ii) Else
         1. Determine how many rows need to be selected based upon the table's row count and the percentage of the table to be extracted. Then set the Row Count Threshold to limit the number of rows extracted by the dynamic SQL
   (b) If ROW COUNT is specified
      (i) If evenly-distributed flag is set
         1. Use the logic defined in Example Embodiment 3
      (ii) Else
         1. Determine how many rows need to be selected based upon the table's row count, the average size of a row in the table and the percentage of the table to be extracted. Then set the Row Count Threshold to limit the number of rows extracted by the dynamic SQL
   (c) If WHERE clause is specified
      (i) Incorporate the WHERE clause into the dynamically generated SQL used to extract the data
   (d) If ALL is specified
      (i) No filters are applied
   (e) If NONE is specified
      (i) All rows are filtered out
   (f) If AS-NEEDED is specified
      (i) determining which rows are required from other tables at the current level in the hierarchy by building a set of primary key values, which are stored logically or physically in temporary structures, representing the rows selected from this table, which are determined based upon which rows are selected in tables that are children to the current table, in order to maintain the databases referential integrity;
(2) Store the generated FROM/WHERE clauses for use by the parent tables in determining dependent rows.
   (a) Depending upon the RDBMS technology in use, temporary tables may be generated to store the primary keys selected from a table so that this information may be used by the parent table to help speed the selection of dependent rows
ii) at the completion a traversing a given hierarchy tree, any temporary structures used to maintain the primary keys of a table being extracted are removed

EXAMPLE EMBODIMENT 5

Summary

Present Invention provides online method of coordinating the reload of databases in standard development, testing and integration environments by coordinating reload requests between the various groups using the databases and integrating with the Loader 220.

Detail

The coordination involved in reloading any test, development, or integration databases requires the database administrator to coordinate the reload requests between the various users the time and effort associated is often one that leads to lost time and effort. The Reload Facilitation Coordinator (RFC) offers an automated method and handling database reload workflow. FIG. 5 shows the database users accessing the portal to coordinate requests and the communicating approved requests to the database administrator using the Extract Batch Processor. The FIG. 6 workflow diagram reflects the steps taken in the reload process.

1) RFC 245, which is a web-based portal, handles the database reload coordination process (240).
2) Each licensed user site will have access to the RFC 245.
3) Facility will be available from the Present Invention applications, which will launch the user's standard web browser to access the site.
4) Interfacing with the RFC 245 occurs in two parts: Account configuration 253 and Request Processing 250.
   a) Account configuration
      i) The RFC 245 will allow the licensed user to register an account administrator 252 who will configure 253 RFC 245 to act as the automated point of contact between the database users 255 and the database administrator 215 who will be executing the reloads
      ii) The account administrator 252 will configure 253 RFC 245 for their account by being able to
         (1) Maintain a set of destination databases (identified by the RDBMS type and server/database name)
         (2) Maintain a set of users (e.g., user name, email, phone, cell . . . ), indicate which destination databases they will be accessing and indicate which users have reload decision-making authority for specific databases
         (3) Maintain a set of extract processes that interact with the destination databases and specify when the reloads will be performed (e.g., as soon as requested, off hours at a specific time, within 2 days of request . . . )
         (4) Map the extract processes to a specific Loader 220.
   b) Available functionality
      i) Users 255 and database administrators 215 will be able to
         (1) Login to the RFC 245 using their email address and a password.
         (2) Start a request for reload 600
         (3) Stop a request for reload
         (4) Confirm or Deny a request for reload 625
         (5) Request status
      ii) The DBA 215 will also be able to schedule and record the results of extract processes
      iii) The reload workflow consists of the following
         (1) Once a user makes a reload request, the RFC 245 sends out an email to all users/administrators associated with the database that will be reloaded by the requested extract 605. This email will indicate that a reload of a database has been requested. If the user has decision-making authority associated with the reload of the database then the email will also contain link to approval/denial we page.
         (2) If there are users with decision-making authority associated with the database to be reloaded then the reload request goes into an Awaiting Approval mode 610.
         (3) If no users with decision-making authority are associated with the database or all those with decision making authority have approved the reload (615, 620) then the reload request goes into a Load Pending state and sends an email to the administrator indicating it is ok to reload the database.
  (4) The DBA specifies schedule of when extract should take place. 635
  (5) Extract Batch Processor will perform reload as defined in RFC schedule 220. It will also post results of the reload into RFC.
  (6) The email will go out to all users indicating that the load completed. Reload request status is changed to 'Completed' 640.
  (7) If at any time the requesting user requests that the reload stop, via the RFC, then the reload goes into a Reload Cancelled mode and all users are informed of this.
  (8) If at any time a user requests a reload status then a status of the load process is displayed and a summary of which users with decision-making authority associated with that database have responded to the request for reload (along with their contact information).
  (9) If users with decision-making authority associated with the database being reloaded deny the reload then the requestor and administrator receive emails indicating this is the case. The emails contain the users name and reason for denial 630.
  (10) Application will maintain ability to escalate request if Approver 612, 614 or Administrator 632, 634 is not available. Based on configurable number of hours without response, background batch process that is continuously runs will send escalation request to Secondary Approver or Secondary Administrator.

EXAMPLE EMBODIMENT 6

Summary

The Present Invention provides the ability to create data for a destination database that is greater than the data currently existing in the source database. This data multiplication can occur at the database level or at the table level. This ability to multiply number of data records does not require application knowledge, or patterns of test information. Data will be created in conformance with each tables Primary keys and existing table relationships (Physical and Logical Foreign Keys).

Detail

The process is as follows:
1. Configuration
  a. Obtain the extract sizing parameters defined at the database level. From the user standpoint the process of defining greater amount of information in the destination database is straightforward using one of the following methods:
    i. User specifies percent value expected in the destination database using source amount as 100%. For example: 300% specification will triple amount of information.
    ii. User specifies desired size in Megabytes of destination database that is greater size than is available in the source database. During Extract Batch Processor 220 execution, source database size will be read and desired size will be converted into percentage value.
    iii. Custom definition of individual table(s) specifying percent value, which can be greater or less than amount of information in source database.
2. Processing
  a. Build a list containing the following information for each table in the source database:
    i. The table name
    ii. The number of parent relationships that table has with all other tables (physical and logical)
    iii. The number of child relationships that table has with all other tables (physical and logical)
    iv. The number of rows in the table
  b. Using foreign key relationships, determine lowest child tables (leaf nodes) in the hierarchy. Those tables typically contain vast majority of information in the database.
  c. For each leaf node table and for each table that has a primary-key/unique index but does not have any physical/logical referential integrity we need the following information
    i. Set a flag indicating this is a table that can be multiplied
    ii. A column in that table that is part of the primary key but not part of a foreign key relationship (physical or logical) will be selected as the unique multiplier column.
    iii. Maximum and Minimum values across the table for that particular column
  d. As part of the regular extract process, referenced in Example Embodiment 4
    i. For each table that can be multiplied, a logical or temporary Multiplier table will be defined. This table will contain a single column composed of a base additive value that will be populated as follows:
      1. In case of user size request is on equal boundary as multiplier of source size (200%, 300% ... 1000% etc) temporary table with number of rows equal to multiplier number (300% will have 3 rows). Rows will contain the following values (Max(ID)−Min(ID)+1)*(row number−1)
      2. In case user request is not on equal boundary of source size (250%, 1010% ... ) follow the process described in Feature 4 to create size equal to fraction percent. Then apply same formula as in the preceding paragraph. For example 250% request will create subset of information of 25% and then will use multiplier of 10 to achieve correct number of information. This extraction SQL will be generated using single command. It will not be multiple processes.
    ii. With the exception of data already in the database, all primary and unique keys will be auto generated to maintain uniqueness of information. The multiplication will be achieved by
      1. Adding the Multiplier table to the FROM clause of the extract logic (defined in the prior Example Embodiment)
      2. Replacing the reference to the unique multiplier column in the source table to a computed column that is the sum of the unique multiplier column and the base additive value in the Multiplier table
      3. The result will cause a Cartesian product of the two tables to occur that will result in the original set of primary keys plus the calculated set of primary keys—the number of sets of calculated keys to appear will be equivalent to the number of entries in the Multiplier table.
      4. The remainder of the columns in the newly generated rows (with the calculated primary keys) will be the same values as those found in the corresponding rows that have the original (non-calculated) primary key.

iii. Because of the differences of available functions and syntax within RDBMS(s), the SQL generated, will also vary. The following example of SQL Server implementation to generate 300% of data. Example (i) demonstrate way to use it with numerical value, example (ii) utilizes date unique/primary key. Different type of functions will be utilized for different RDBMS based on the data type of the unique/primary key:

(i) Numerical value key.
CREATE TempCartesianTable (keyMultiplier int);

```
SELECT MAX(keyInt) – MIN(keyInt) + 1 INTO
:diffMinMaxInt
    FROM SourceTable;
-- For selection of original 100% records
-- (It will always contain 0)
INSERT INTO TempCartesianTable VALUE
(:diffMinMaxInt * 0);
-- For selection of 2nd set of records - 200%
INSERT INTO TempCartesianTable VALUE
(:diffMinMaxInt * 1);
-- For selection of 3rd set of records - 300%
INSERT INTO TempCartesianTable VALUE
(:diffMinMaxInt * 2);
-- Select 300% of information
SELECT key + keyMultiplier AS key, ....
    FROM SourceTable, TempCartesianTable
(ii) Date value key
CREATE TempCartesianTable (keyMultiplier int);
-- Select difference in days between minimum
date and
maximum date + 1
SELECT DATEDIFF(dd, MIN(keyDate), MAX(keyDate))
+ 1
    INTO :diffMinMaxDate
    FROM SourceTable;
-- For selection of original 100% records
-- (It will always contain 0)
INSERT INTO TempCartesianTable VALUE
(:diffMinMaxDate * 0);
-- For selection of 2nd set of records - 200%
INSERT INTO TempCartesianTable VALUE
(:diffMinMaxDate * 1);
-- For selection of 3rd set of records - 300%
INSERT INTO TempCartesianTable VALUE
(:diffMinMaxDate * 2);
-- Select 300% of information
SELECT DateAdd(dd, keyMultiplier , keyDate) AS key, ....
    FROM SourceTable, TempCartesianTable
```

EXAMPLE EMBODIMENT 7

Summary

As a variation of Example Embodiment 1, we perform data extract without need for flat file as an intermediary. It combines the data extract and load into a single process.

Prerequisite for this process is that

1) Source and Destination schemas reside on the same server; or
2) Destination server is reachable through database link (DBLink) setup on the source database Detail Overall performance of the process is greatly improved if selected transformed information from the source database can be transferred to destination as a single process.

The following example demonstrate in SQL Server transfer between 2 schemas SELECT ListOfTransformedColumns INTO DestinationSchema. . TransferTable
FROM SourceSchema. . TransferTable Using this technique we combine Extract and Transform Scalar Data 320 with_Load scalar data to Destination 365. Combined step will be performed as part of step 365.

One of the limitations of this technique is a requirement that Source Database 110 and Destination Database 120 have to be available at the same time, while Example Embodiment 1 does not have this limitation.

While this invention has been particularly shown and described with references to preferred embodiments thereof, it will be understood by those skilled in the art that various changes in form and details may be made therein without departing from the scope of the invention encompassed by the appended claims.

For example, described above is a web portal embodiment of the invention but it is understood that a client/server or other architecture implementation of the invention could be employed.

What is claimed is:

1. Computer apparatus for creating a destination database from a given source database, comprising:
   an extractor for extracting catalog information and data from a given source database having certain data indicated as proprietary data to create a destination database, the source and destination databases being relational databases, and the extractor configured to filter the data extracted from the source database based on configuration values specific to a particular extract process that indicate a schema-level filter, which specifies a size of the destination database as a specific size in megabytes or as a percentage of a size of the source database;
   driving tables, which are an optimum number of tables in the source database for which filtering is to be applied to limit the data extracted from the tables, the filtering of the driving tables driving a selection from the remainder of the tables in the source database based on relationships of the driving tables with other tables in the source database, the relationships being represented by a hierarchy of tables;
   the extractor configured to (i) build the hierarchy of tables based on physical referential integrity defined by foreign key relationships among the tables and based on logical relationships among the tables, (ii) designate tables representing leaf-level tables in the hierarchy of tables as the driving tables, and (iii) assign to each table a percent filter indicating a percentage of the rows in the table that are to be extracted, the value of the percentage being equal to the percentage of the size of the source database in an event the schema-level filter so specifies or being a calculated percentage that is determined in an event the schema-level filter specifies a specific size in megabytes; and
   a data transformer coupled to the extractor for preventing the proprietary data from being propagated from the source database to the destination database during extraction such that the destination database is populated by a referentially intact set of filtered data from the source database that is free of proprietary information by applying to data of a foreign key of one table a same transformation applied to data of a related primary key of another table, the foreign and related primary keys and application of the same transformation to the data thereof being determined through traversal of the hierarchy of tables.

2. Computer apparatus as claimed in claim 1 wherein the extractor utilizes system functions and native database utilities to perform the extraction from the source database and load into the destination database.

3. Computer apparatus as claimed in claim 1 wherein:
the source database is a relational database; and
the extractor is implemented as dynamically generated SQL queries.

4. Computer apparatus as claimed in claim 3 wherein the extractor formats results of the SQL queries into working files and then loads the formatted results from the working files, using native bulk extraction utilities, into the destination database using a bulk loader native to the source database.

5. Computer apparatus as claimed in claim 1 wherein the configuration values indicate
a custom filter, which consists of specified table-level filters for one or more tables.

6. Computer apparatus as claimed in claim 5 wherein
the driving tables are determined as those tables for which filter criteria is specified in the form of any combination of
1. WHERE clause, to be incorporated into the SQL statement selecting rows from that table; or a
2. COUNT, indicating the number of rows to be selected from that table; or a
3. PERCENT, indicating what percent of the rows in the table are to be selected; or a
4. ALL indicator, specifying all rows will be selected from that table; or a
5. NONE indicator, specifying no rows will be selected from that table; or a
6. AS-NEEDED indicator, specifying that only rows related to data in other tables will be selected.

7. Computer apparatus as claimed in claim 1 wherein the extractor employs an algorithm allowing a percentage of information to be extracted from a particular table in the source database and having the distribution of data contained within that extracted subset of data mimic the distribution of data contained within the source database table, by
Creating a logical selection of the set of all unique identifiers in the source table in an ascending order and assigning them a corresponding row number, beginning with one and ending with the number of rows in the source table; and
Selecting a final result set from that table by using a SQL query that employs the assigned row number to determine if the row should be selected.

8. Computer apparatus as claimed in claim 1 wherein the extractor further multiplies the size of a database using data multiplication logic to create records having unique identifiers in predetermined tables.

9. Computer apparatus as claimed in claim 1 wherein the extractor further builds the set of table hierarchies and associated attributes that define and expedite data extraction.

10. Computer apparatus as claimed in claim 1 wherein the extractor traverses the table hierarchies of the source database in such a manner as to make efficient use of system resources on a server hosting the source database and in such a manner as to expedite a bulk extraction of a referentially intact dataset.

11. Computer apparatus as claimed in claim 1 wherein:
the proprietary data is any of credit/debit card numbers, people's names, social security numbers, phone numbers or other columns of information contained within the source database that the owner considers proprietary; and
the data transformer substitutes random generated data for the proprietary data such that the extractor uses the random or formula-based generated data to populate the destination database, based upon the configuration parameters of a specific extract process, that column type in the source database, and the table relationships associated with the source database is maintained.

12. Computer apparatus as claimed in claim 11 wherein the data transformer utilizes functions native to the source database and coding techniques to generate masking data for the extraction of transformed data.

13. Computer apparatus as claimed in claim 1 wherein the data transformer employs standardized data transform algorithms.

14. A computer system for creating a destination database from a given source database, comprising:
a navigator for viewing database information, configuring database level parameters and defining configuration parameters associated with a specific extract process that indicate a schema-level filter, which specifies a size of the destination database as a specific size in megabytes or as a percentage of a size of the source database;
an extraction assembly for carrying out the extract process to extract data from the source database and use said extracted data to populate and produce the destination database, the source and destination databases being relational databases, and the extraction assembly configured to filter the data extracted from the source database based on the configuration parameters;
driving tables, which are an optimum number of tables in the source database for which filtering is to be applied to limit the data extracted from the tables, the filtering of the driving tables driving a selection from the remainder of the tables in the source database based on relationships of the driving tables with other tables in the source database, the relationships being represented by a hierarchy of tables; and
the extraction assembly configured to (i) build the hierarchy of tables based on physical referential integrity defined by foreign key relationships among the tables and based on logical relationships among the tables, (ii) designate tables representing leaf-level tables in the hierarchy of tables as the driving tables, and (iii) assign to each table a percent filter indicating a percentage of the rows in the table that are to be extracted, the value of the percentage being equal to the percentage of the size of the source database in an event the schema-level filter so specifies or being a calculated percentage that is determined in an event the schema-level filter specifies a specific size in megabytes.

15. Computer system as claimed in claim 14 wherein the navigator, which operates across a variety of RDBMS platforms, provides the user with the ability to
a. View database configuration parameters and database objects; and
b. Define database level configuration parameters, such as connection information, standard data transforms to be applied to all extracts from a specific source database and logical foreign keys, which are used to supplement the existing physical foreign keys for a particular source database; and
c. Define extract process configuration parameters such as a source database, destination database, type of extract, extract filters, and other parameters necessary to define the process for copying a subset or superset of a database from one database server to another.

16. A computer system as claimed in claim 15 wherein the SDTA are applied to each extract process definition, which defines how data is extracted from a specific database, in order to ensure that all data extracted from that database as part of an extract process will incorporate the set of data transformations defined for the database.

17. A computer system as claimed in claim 14 wherein the computer system is an application in a global network, and enables a user to coordinate and schedule the reload of databases amongst various users.

18. A method for creating a destination database from a given source database, comprising the computer implemented steps of:

a. extracting catalog information and data from the given source database to create the destination database, the source and destination databases being relational databases, and the source database having certain data indicated as proprietary data;

filtering the data extracted from the source database based on configuration values specific to a particular extract process that indicate a schema-level filter, which specifies a size of the destination database as a specific size in megabytes or as a percentage of a size of the source database;

automatically selecting driving tables, which are an optimum number of tables in the source database for which filtering is to be applied to limit the data extracted from the tables, the filtering of the driving tables driving a selection from the remainder of the tables in the source database based on relationships of the driving tables with other tables in the source database, the relationships being represented by a hierarchy of tables, and the automatic selection of the driving tables including:

(i) building the hierarchy of tables based on physical referential integrity defined by foreign key relationships among the tables and based on logical relationships among the tables;

(ii) designating tables representing leaf-level tables in the hierarchy of tables as the driving tables; and (iii) assigning to each table a percent filter indicating a percentage of the rows in the table that are to be extracted, the value of the percentage being equal to the percentage of the size of the source database in an event the schema-level filter so specifies or being a calculated percentage that is determined in an event the schema-level filter specifies a specific size in megabytes; and b. preventing the proprietary data from being propagated from the source database to the destination database during extraction by applying to data of a foreign key of one table a same transformation applied to data of a related primary key of another table, the foreign and related primary keys and application of the same transformation to the data thereof being determined through traversal of the hierarchy of tables;

c. the steps of extracting and preventing providing the destination database to be populated by a referentially intact set of filtered data free of proprietary information.

19. A method as claimed in claim 18 wherein:

a. the proprietary data may contain any of credit/debit card numbers, people names, social security numbers and phone numbers or other columns of information contained within the source database that the owner considers proprietary; and b. the step of preventing includes performing a data transformation that substitutes random generated data for the proprietary data such that the destination database is populated with the random generated data instead of the proprietary data and referential integrity of the destination database is maintained.

20. A method as claimed in claim 19 wherein the data transformation employs standardized data transformation algorithms.

* * * * *